United States Patent Office 2,921,918
Patented Jan. 19, 1960

2,921,918
METHOD OF PROVIDING PNEUMATIC TIRES WITH AN ANTI-SKID COATING

Melvin Mooney, Mountain Lakes, and Theodore L. Ether, Clifton, N.J., assignors to United States Rubber Company, New York, N.Y., a corporation of New Jersey No Drawing. Application June 29, 1954
Serial No. 440,241

4 Claims. (Cl. 260—27)

This invention relates to a method of providing pneumatic tires with an anti-skid coating and to pneumatic tires bearing such coating, as well as to a solution for application of such coating.

The inability of ordinary rubber pneumatic tires to grip snowy or icy road surfaces sufficiently to provide adequate starting traction and safe stopping and turning has heretofore placed a severe limitation on the extent to which automobiles could be operated conveniently and safely on ice or snow. The present invention is directed to a convenient and economical means for increasing the friction between a rubber pneumatic tire and an icy or snowy surface, to a practical degree sufficient to substantially enhance the resistance of the tire to skidding or slipping under such conditions.

The invention involves application, to the tread surface of a wet tire, of a solution of a tacky resinous material, an elastomer and a plasticizer, in a water-miscible solvent for both the resin and the elastomer. The solution functions as an anti-slip agent by depositing a tacky, resinous coating which adheres to a wet or dry rubber surface after the resin solvent evaporates or is extracted by water. The anti-slip properties of such a coating are excellent and are rendered substantially more durable by the presence of the elastomer and the plasticizer.

The preferred tacky resinous material for use in the invention is wood rosin. A commercially available material sold under the trade-name of "Galex" rosin (di-, tri-, and tetrahydroabietic acids) is also suitable, as is the commercially available material sold under the tradename "Vinsol" (pine wood rosin). Other resins such as paracoumarone-indene resin (sold under the tradename "Cumar" resin) may also be used. Such resinous materials are employed along with suitable elastomers. The amount of elastomer generally ranges from about 5 to 20 parts, per 100 parts of the resin. The elastomer employed is insoluble in water, but soluble in the water-miscible solvent. An elastomer that has been found to be particularly suitable for this purpose is the rubbery copolymer of butadiene with acrylonitrile, known as GR–A or Buna N, or by such trade names as Paracril and Perbunan. Such elastomer should be broken down to a Mooney viscosity of 30–40 (ML–4 at 100° C.) to facilitate subsequent dissolution in the solvent. Good results are also obtainable by employing the rubbery butadiene-acrylonitrile copolymer that has been modified by reaction with from 1 to 15%—for example, about 10%—of its weight of maleic anhydride, as disclosed, for example, in application Serial No. 342,-748, filed March 18, 1953. Another elastomer that produces satisfactory results is the polyurethane type of synthetic rubber, made by reaction of diisocyanates with linear polyesters, as disclosed in Rubber Chem. & Tech. 23, pages 812–835 (1950).

The tacky resin and the elastomer are compounded with one or more suitable plasticizers for the resin or elastomer, or both. When the resin is wood rosin, suitable plasticizers include rosin acid esters (e.g., the material sold under the trade-name "Abalyn"), or turpentine. Suitable plasticizers for the butadiene-acrylonitrile elastomer include esters such as dibutyl phthalate, and trioctyl phosphate (the latter being sold under the trade-name "Flexol TOF"). We generally employ from about 3 to 30 parts of the plasticizers, per 100 parts of resin.

In accordance with the invention, the resin, the elastomer and the plasticizer are dissolved in a suitable water-miscible solvent, such as acetone, methyl ethyl ketone, or dioxan, or other ketones, to which a small amount of methanol may be added, if desired, to reduce the viscosity of the solution and to prevent its gelling at low temperatures. Not all of the mentioned ketones are miscible in water in all proportions, but they are operative in the invention and miscible with water in at least some proportion. In other words, they are all capable of taking up some appreciable quantity of water or vice versa. The resulting solution is sprayed or otherwise spread on the wet tread surface of the tire, whereupon there is soon deposited on the tread a highly tacky and durable coating. The resulting film maintains its tack and will not fall off or be rubbed off easily as does a film deposited by a solution of rosin only.

It should be pointed out that tires in service at 0° C. to —5° C. or so, run at temperatures above 0° C. and are wet, even when roads are not wet. When the air temperature is so low that tires run dry, friction is much higher and anti-skid solution is not necessary.

The following example will serve to illustrate the invention in more detail.

Example

A solution was prepared from the following ingredients:

Wood rosin _____ 100 parts by weight ⎫
Paracril by modified ma-                       ⎪
  leic anhydride _____ 10 parts by weight  ⎬ 100 vols.
Dibutyl phthalate _____ 7.5 parts by weight  ⎪
Acetone _____ 250 parts by weight    ⎭
Methanol _____ 3.64 vols.

The solution was prepared by making a cement of 20% by weight of maleic anhydride-modified Paracril in acetone in a gear mixer. To the cement the dibutyl phthalate, acetone, and rosin were added with continual stirring. After the rosin was completely dissolved, the methanol was added slowly with constant stirring. The final solution was then cleaned by passing it through a tightly woven cloth filter. This solution was sprayed onto a wet tire tread surface, whereupon the water on the tire entered into the solution and reduced the solubility of the rosin and the rubber, thereby causing coagulation. The coagulum was very sticky and adhered well to the tire surface, but the coagulation required a little time, and best results were obtained by waiting 15 to 30 seconds after spraying before moving the car.

Pneumatic tires provided with such a coating were tested in the laboratory as well as on icy and snowy roads and on an ice rink, and were shown to have remarkably enhanced anti-slip qualities, compared to ordinary pneumatic tires.

In one series of tests, worn snow tries were treated with the solution of the foregoing example and mounted on a test car which was connected by a cable to a trailing car having a dynamometer in the cable system. When the test car was started on a frozen ice surface it was observed that a force of 870 pounds was developed while the trailing car was dragged with its brakes on. The coefficient of friction between the treated tire surface and the ice was 0.543, while the acceleration from standstill was from 0.03 to 0.05 g. In contrast to this, similar worn snow tires without the coating of the invention displayed a static traction force under similar conditions of only about 322–363 pounds, while the coefficient of friction was 0.200–0.227, and the acceleration from standstill was from 0.01 to 0.02 g.

After the test car with the treated tires was driven 0.4 mile on the frozen ice surface the force observed on the dynamometer was 750 pounds, the coefficient of friction was 0.470, and the acceleration was from 0.03 g. to 0.05 g., indicating that the coating had retained to a substantial extent its anti-slip characteristics. In direct contrast to this, similar snow tires provided with a plain wood rosin coating, after being driven for 0.4 mile on the frozen ice surface, developed a tractive force of only 363 pounds on the dynamometer, a coefficient of friction of only 0.227, and an acceleration from standstill of only 0.01 g. to 0.02 g., which is no better than was obtained with the untreated control tires.

It will be apparent from this that the method and composition of the invention produced a coated pneumatic tire capable of greatly improved performance with respect to traction on an icy surface. It will also be apparent from these data that the benefits of the invention are not obtainable by employing a coating of rosin alone, since such coating is brittle and soon wears off.

The inclusion of a small proportion (generally from 2 to 10% by volume) of methyl alcohol in the acetone solution of maleic anhydride modified GR–A and rosin is particularly beneficial. The resulting solution does not tend to gel or coagulate upon standing in bulk at low temperature, and therefore it can be stored indefinitely under the usual winter conditions, and still remain in good condition for immediate use. The methyl alcohol, in combination with the acetone, apparently acts by making the mixed solvents a somewhat poorer solvent for the rubber, thereby reducing the tendency of the rubber constituent to form a gel.

Having thus described our invention, what we claim and desire to protect by Letters Patent is:

1. A composition for depositing on the surface of a rubber tire having a tread portion with a rubber surface a coating which is highly skid-resistant when wetted, comprising a solution, in a ketone that is at least partially miscible with water, of 100 parts by weight of wood rosin, from 5 to 20 parts by weight of maleic anhydride modified butadiene-acrylonitrile elastomer per 100 parts of said resin, and additionally from 3 to 30 parts by weight of another material which is a plasticizer for the coating per 100 parts of said resin, the said solution containing from 2 to 10% by volume of methanol.

2. A composition as in claim 1, in which the said ketone is acetone.

3. A composition as in claim 1, in which the said other material which is a plasticizer is dibutyl phthalate.

4. A composition as in claim 1, in which the said ketone is acetone, and the said other material which is a plasticizer is dibutyl phthalate.

References Cited in the file of this patent

UNITED STATES PATENTS

| | | |
|---|---|---|
| 1,609,644 | Darling | Dec. 7, 1926 |
| 1,892,167 | Semon | Dec. 27, 1932 |
| 1,930,585 | Covey | Oct. 17, 1933 |
| 2,306,487 | Mitchell | Dec. 29, 1942 |
| 2,501,654 | Brams | Mar. 28, 1950 |
| 2,610,162 | Hoffmann | Sept. 9, 1952 |
| 2,692,245 | Groves et al. | Oct. 19, 1954 |
| 2,710,821 | Fischer | June 14, 1955 |

FOREIGN PATENTS

| | | |
|---|---|---|
| 470,259 | Great Britain | Aug. 10, 1937 |